US008935319B2

(12) United States Patent
Calo et al.

(10) Patent No.: US 8,935,319 B2
(45) Date of Patent: *Jan. 13, 2015

(54) DATA CAPTURE SYSTEM

(75) Inventors: Seraphin Bernard Calo, Cortlandt Manor, NY (US); Raheleh B. Dilmaghani, Elmsford, NY (US); Douglas M. Freimuth, New York, NY (US); Raghu K. Ganti, Elmsford, NY (US); Keith William Grueneberg, Stewart Manor, NY (US); Fan Ye, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/472,098

(22) Filed: May 15, 2012

(65) Prior Publication Data

US 2013/0273901 A1 Oct. 17, 2013

Related U.S. Application Data

(63) Continuation of application No. 13/447,936, filed on Apr. 16, 2012.

(51) Int. Cl.
*G06F 13/00* (2006.01)
*H04L 29/08* (2006.01)

(52) U.S. Cl.
CPC ................................ *H04L 29/08072* (2013.01)
USPC ....................................................... 709/203

(58) Field of Classification Search
CPC .............. H04L 29/08072; H04L 29/06; H04L 29/0809; H04L 29/08117; G06Q 30/02
USPC .................................................. 709/219, 223
See application file for complete search history.

(56) References Cited

U.S. PATENT DOCUMENTS

| 7,551,922 B2 | 6/2009 | Roskowski et al. |
| 7,756,827 B1 | 7/2010 | Yung et al. |
| 2003/0058874 A1 | 3/2003 | Sahaya et al. |

(Continued)

OTHER PUBLICATIONS

B. Hull et al., "Cartel: a distributed mobile sensor computing system", In Proc. of SenSys, pp. 125-138, 2006.

(Continued)

*Primary Examiner* — Robert B Harrell
(74) *Attorney, Agent, or Firm* — August Law, LLC; George Willinghan

(57) ABSTRACT

A common infrastructure collects diverse data and information from large numbers of mobile devices and traditional sensors at Internet scale to support multiple different applications simultaneously. The infrastructure includes a backend phenomenon layer that provides high level abstractions to applications such that they can express their data and information needs in a declarative fashion and coordinate the data collection and processing activities for all applications. An edge layer that manages devices, receives collection requirements from the backend layer, configures and instructs devices for data collection, and conducts aggregation and primitive processing of the data. This layer contains network edge nodes, such as base stations in a cellular network. Each node manages a set of local data generating networked devices. The device agent data layer using common agents on the data generating networked devices receives data collection instructions from the edge layer, performs data collection.

19 Claims, 2 Drawing Sheets

(56) References Cited

U.S. PATENT DOCUMENTS

| | | | |
|---|---|---|---|
| 2008/0258880 A1 | 10/2008 | Smith et al. | |
| 2009/0224941 A1 | 9/2009 | Kansal et al. | |
| 2010/0023531 A1 | 1/2010 | Brisebois et al. | |
| 2010/0023952 A1* | 1/2010 | Sandoval et al. | 719/318 |
| 2011/0047597 A1 | 2/2011 | Mahaffey et al. | |
| 2011/0276951 A1 | 11/2011 | Jain | |
| 2012/0201418 A1* | 8/2012 | Bellwood et al. | 382/103 |

OTHER PUBLICATIONS

J. Burke et al., "Participatory sensing", Workshop on World-Sensor-Web, co-located with ACM SenSys, 2006.

P. Dutta et al, "Demo abstract: Common sense: Participatory urban sensing using a network of handheld air quality monitors", In Proc. of ACM SenSys, pp. 349-350 (2009).

P. Mohan, V. Padmanabhan and R. Ramijee, "Nericell: mobile smartphones", In Proc. of ACM SenSys, pp. 323-336, 2008.

R. Ganti, F. Ye and H. Lei, "Mobile crowdsensing: Current state and future challenges", IEEE Communications Magazine, 49(11):32-39, 2011.

R. Ganti, N. Pham, H. Ahmadi, S. Nangia and T. Abdelzaher, "Greengps: A participatory sensing fuel-effient maps application", In Proc. of MobiSys, pp. 151-164, 2010.

S. B. Eisenman et al., "The bikenet mobile sensing system for cyclist experience mapping", In Proc. of SenSys, Nov. 2007.

* cited by examiner

DATA CAPTURE SYSTEM

CROSS-REFERENCE TO RELATED APPLICATIONS

The present application is a continuation of co-pending U.S. patent application Ser. No. 13/447,936 filed Apr. 16, 2012. The entire disclosure of that application is incorporated herein by reference.

STATEMENT REGARDING FEDERALLY SPONSORED RESEARCH

The invention disclosed herein was made with U.S. Government support under Contract No. W911NF-06-3-0001 awarded by the U.S. Department of Defense. The Government has certain rights in this invention.

FIELD OF THE INVENTION

The present invention relates to data collection in networked devices.

BACKGROUND OF THE INVENTION

The use of networked based social networks, for example, Facebook, Twitter, FourSquare, and Google+ has steadily increased along with the use of smartphones equipped with sensors and Internet connectivity capabilities. The marriage of these technologies, smartphones and social networks, will likely yield applications that leverage the data collection capabilities of large numbers of smartphones by applications such as crowdsourcing. For example, real-time traffic monitoring for Google maps is enabled through individuals sharing their location and speed information from their smartphones. This integration also leverages social networking applications for disaster management. For example, an oil spill or other environmental disaster can be monitored by individuals by sharing pictures or other relevant information across a social networking site. A chemical spill or the air quality around a given disaster can be monitored similarly using, for example, air sampling equipment associated with the mobile devices.

The information obtained through the use of these technologies can be aggregated, processed, and then consumed by individuals or by decision makers and public agencies. Existing approaches to such applications have utilized vertical integration. Each application needs its own software agent running on the devices collecting data specific to that application's needs and a devoted backend module for aggregating and processing the collected data to generate desired results. Such a vertical approach aims to optimize the performance of a single application. However, with the proliferation of such applications, great inefficiency and even conflicts may arise for both the software agents and the back-end modules. Many times, these applications need the same type of raw data and access the same physical sensor. The software agents compete for access and repeatedly collect the same raw data. Such uncoordinated collection activities are inefficient and consume resources. For applications in the same domain, e.g., traffic and transportation related, these applications also repeat common primitive processing of the raw data to extract information of higher semantic content. For example, the raw time series of acceleration can be processed to detect the existence of potholes.

Applications leveraging data collection from mobile devices all suffer from a common drawback that the data collection is designed specifically for the particular application, including the software agent running on devices, the backend middleware that configures and controls devices and the primitive data processing performed on devices or in the middleware. Thus the type of data collected and the way these data are collected, i.e., sampling frequency, and processed are all static and tied to the specific needs of the application. The software developed in the context of one application cannot be reused for another application.

These limitations yield an inefficiency on devices. When multiple applications need to leverage the same set of underlying devices, they have to each install their own software agent on the device. These agents are not arranged to work with each other, and they may compete for resources, resulting in conflicts. In addition, these limitations produce inefficiency in middleware. Many applications in the same domain share a common need for similar data. When each application has its own specific middleware, duplicate data collection and redundant data processing are inevitable. These limitations also result in a lack of flexibility. Any application specific middleware is quite customized to the type of data and process needed by that application. This middleware cannot be used to support the diverse needs of different applications simultaneously.

Another approach is similar to "data warehousing". All kinds of data are collected blindly and dumped into a warehouse. Then applications extract relevant data and perform further processing. This approach, however, is inappropriate especially for systems that use mobile devices as the data collectors. The battery power and communication bandwidth of mobile devices are scarce resources. Continuous collection of all kinds of data can quickly exhaust the energy and monopolize the bandwidth. In addition, the volume of data generated from all the sensors of billions of devices is overwhelming. The network, storage and processing capacity of a given system may not be able to keep up with the volume, causing the "drowning in data" symptom.

SUMMARY OF THE INVENTION

Systems and methods in accordance with exemplary embodiment of the present invention provide a common infrastructure for real time data collection from large numbers of mobile devices including smartphones, tablet computers and traditional sensors such as traffic and security cameras. Multiple different applications running on one or more computing systems that may have very diverse needs in terms of data type, geographical areas, and time domain where the data should be collected are supported simultaneously. The present invention utilizes a common infrastructure that serves the data and information needs of diverse applications from any one of a plurality of physical sensors, e.g., sensors on smart devices and traditional data sensors across networks including local area networks and wide area networks even on the planetary on internet scale. A high level interface is provided to applications running on computing systems to express the desired data collection specifications at a high level of abstraction, called phenomena collection specifications. Therefore, the applications do not have to identify raw data.

The data collection system of the present invention interprets the data collection specification to determine the kinds of data or information needed. The appropriate data collection devices within the data collection system capable of obtaining the desired raw data based on given policies are identified in addition to any primitive processing required to transform the raw data into phenomena data of higher semantic levels more readily consumable by applications. The infrastructure of the present invention improves bandwidth utilization and energy consumption by supporting data reuse at both the device and middleware level. The same raw data is collected and processed only once, but can be reused by many different applications. The infrastructure identifies common data and information needs across different applications, ensuring that the same data are collected and processed only once before passing these data to multiple requesting applications.

In accordance with one exemplary embodiment, the present invention is directed to a method for data collection from networked devices. In this method, a data request specification is received at a phenomenon layer of a data capture system from an application running on a computing system. The data request specification contains an identification of types of data, a time duration for collection of the types of data and a physical location associated with the types of data. In one embodiment, the data collection specification is received as a phenomenon collection specification containing an identification of at least one phenomenon desired by the application. Data collection requirements are determined at the phenomenon layer that are responsive to the data request specification. The data collection requirements include raw data and phenomena responsive to the data request specification. Each phenomenon is an occurrence of a given event at a given physical location over a given time duration.

A set of common software agents within the data capture system capable of obtaining raw data sufficient to satisfy the data collection requirements are identified at an edge layer in the data capture system. Each common software agent is running on one of a plurality of data generating networked devices. The identified common software agents are used to obtain the raw data, and the phenomena in the data collection requirements are generated at the edge layer using the obtained raw data. The raw data and phenomena responsive to the data request specification are then communicated to the application.

In one embodiment, the edge layer contains a plurality of edge nodes, and an identification of phenomenon types supported and physical locations covered by each edge node is maintained at the phenomenon layer. The data collection requirements are then communicated from the phenomenon layer to appropriate edge nodes based on at least one of the identified phenomenon types and covered physical locations. In addition, state data for the data request specification are maintained at the phenomenon layer. These maintained state data are cleared upon termination of the data request specification and include a remaining time duration for data collection responsive to the data request specification and an identification of edge nodes within the edge layer involved in the data collection.

In one embodiment, raw data and phenomena responsive to the data request specification are aggregated at the phenomenon layer. The aggregated raw data and phenomena are communicated from the phenomena layer to the application, and the aggregated raw data and phenomena are stored at the phenomenon layer for use in responding to subsequent data request specifications.

In one embodiment, the edge layer includes a plurality of edge nodes. Each edge node contains a plurality of edge analytics, and each edge analytic associated with a given phenomenon created using the raw data and capable of being invoked to satisfy the data collection requirements. The edge analytics associated with the phenomena in the data collection requirements are used to generate the phenomena. In one embodiment, the plurality of edge analytics is maintained in a library within the edge layer. New edge analytics are added to the library, and obsolete edge analytics are removed from the library. In one embodiment, the edge layer includes a plurality of edge nodes in a network. Each edge node is in communication with at least one of a plurality of software agents running on the plurality of data generating networked devices. These data generating networked devices include cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases and combinations thereof. In one embodiment, the edge nodes are base stations in a cellular telephone network, and the data generating networked devices are cellular network communication enabled devices.

In one embodiment, state information is maintained at the edge layer for each identified common software agent while that common software agent is obtaining the raw data. In addition, registration and status information is maintained for each data generating networked device. In one embodiment, the edge layer includes a plurality of edge nodes, and each data generating networked device is registered with one of the edge nodes. The types of raw data available from each data generating networked device are communicated to the edge node on which that data generating networked device is registered in addition to periodic updates from each data generating networked device to the edge node on which that data generating networked device is registered. These periodic updates include location data and energy levels for the devices.

In one exemplary embodiment, the present invention is directed to a method for data collection from networked devices. Data request specifications are received at a phenomenon layer of a data capture system from a plurality of applications running on one or more computing systems. Each data request specification is an identification of types of data, a time duration for collection of the types of data and a physical locations associated with the types of data. In one embodiment, the data collection specifications are received as phenomenon collection specifications containing an identification of at least one phenomenon desired by each application. Data collection requirements are determined at the phenomenon layer responsive to all of the received data request specifications. The data collection requirements include raw data and phenomena responsive to the data request specifications. Each phenomenon represents an occurrence of a given event at a given physical location over a given time duration. A set of common software agents within the data capture system capable of obtaining raw data sufficient to satisfy the data collection requirements is identified at an edge layer in the data capture system. Each common software agent is running on one of a plurality of data generating networked devices.

The identified common software agents are used to obtain the raw data, and the phenomena in the data collection requirements are generated at the edge layer. The raw data and phenomena responsive to the data request specification are communicated to the phenomenon layer, and the phenomenon layer is used to coordinate communication of the phenomena and raw data among the applications. In one embodiment, the raw data and phenomena responsive to the data request specifications are aggregated at the phenomenon layer and are stored at the phenomenon layer for use in responding to subsequent data request specifications. In one embodiment, the edge layer includes a plurality of edge analytics. Each edge analytic is associated with a given phenomenon created using the raw data and is capable of being invoked to satisfy the data collection requirements. The edge analytics associated with the phenomena in the data collection requirements are used to generate the phenomena from raw data collected from the data generating networked devices. In one embodiment, the edge layer includes a plurality of edge nodes in a network. Each edge node is in communication with at least one of a plurality of software agents running on the plurality of data generating networked devices. In one embodiment, the edge nodes are base stations in a cellular telephone network, and the data generating networked devices are cellular network communication enabled devices.

The present invention is also directed to a data capture system that includes a phenomenon layer configured to receive data request specifications and to generate data collection requirements responsive to the data request specifications. Each data request specification containing an identification of types of data, a time duration for collection of the types of data and physical locations associated with the types of data. An edge layer is provided in communication with the phenomenon layer and is configured to receive the data collection requirements and to identify raw data required to satisfy the data collection requirements. The system also includes a plurality of identical common software agents. Each common software agent is executing on one of a plurality of data generating networked devices and is in communication with the edge layer. The common software agents are configured to obtain the identified raw data required to satisfy the data collection requirements.

In one embodiment, the phenomenon layer is configured to receive data request specifications that are phenomenon collection specifications. Each phenomenon collection specification contains an identification of at least one phenomenon desired by an application executing on a computing system, and each phenomenon represents an occurrence of a given event at a given physical location over a given period of time. In one embodiment, the data collection requirements include raw data and phenomena, where each phenomenon is an occurrence of a given event at a given physical location over a given period of time and is generated from raw data. In one embodiment, the phenomenon layer include a collection task manager configured to provide an interface for applications running on computing systems to submit data request specifications and to forward the generated data collection requirements to the edge layer, a backend metadata manager configured to maintain metadata regarding phenomena capable of being generated by different edge nodes at the edge layer and a physical location coverage associated with each edge node and a backend data manager configured to receive raw data obtained from the data generating networked devices and phenomena generated in the edge layer using the raw data, to aggregate the received raw data and phenomena and to communicate the raw data and phenomena to the applications that submit data request specifications. In one embodiment, the collection task manager is further configured to maintain state information for data collection tasks initiated at the edge layer to satisfy the data collection requirements.

In one embodiment, the edge layer contains a plurality of edge nodes, and each edge node includes a plurality of edge analytics. Each edge analytic is configured to process raw data obtained from the common software agents to generate phenomena contained in the data collection requirements. In one embodiment, the edge layer on an edge node includes an edge task manager configured to maintain state information for data collection tasks initiated to satisfy the data collection requirements and an edge metadata manager configured to maintain registration and status information for each on the of the plurality of data generating networked devices. The registration and status information include a present location of each data generating networked device and a present energy level for each data generating networked device. In one embodiment, the edge layer also includes an edge analytics engine containing a plurality of edge analytics. Each edge analytic is configured to process raw data obtained from the common software agents to generate phenomena contained in the data collection requirements. In one embodiment, the edge layer includes an edge analytics runtime engine configured to run edge analytics. In addition, the edge layer includes an edge data manager configured to aggregate the identified raw data obtained from the common software agents and to communicate at least one of the aggregated identified raw data and phenomenon data created using edge analytics to a backend data manager in the phenomenon layer.

In one embodiment, the edge layer includes a plurality of edge nodes, and each one of the plurality of data generating networked devices is registered on one of the edge nodes. These data generating networked devices include cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases and combinations thereof. In one embodiment, the edge layer includes a plurality of edge nodes in a network, where each edge node is in communication with at least one of a plurality of software agents running on the plurality of data generating networked devices. In one embodiment, the edge nodes are base stations in a cellular telephone network, and the data generating networked devices are cellular network communication enabled devices.

Exemplary embodiments in accordance with the present invention are also directed to a data capture system that include a phenomenon layer configured to receive data request specifications and to generate data collection requirements responsive to the data request specifications. Each data request specification includes an identification of types of data, a time duration for collection of the types of data and physical locations associated with the types of data. An edge layer is provided in communication with the phenomenon layer and includes a plurality of nodes. Each node is a base station in a cellular network. A plurality of common software agents is included. Each common software agent is executing on one of a plurality of data generating networked devices and is in communication with the plurality of nodes in the edge layer. Each data generating networked device is a cellular network communication enabled device, and the common software agents are configured to obtain the identified raw data required to satisfy the data collection requirements from the cellular network communication enabled devices. In one embodiment, each cellular network communication enabled device includes physical sensors, and the raw data are data obtained from these physical sensors.

In one embodiment, a plurality of edge analytics are provided that are disposed on the plurality of nodes in the edge layer. Each edge analytic is configured to process raw data obtained from the common software agents to generate phenomena contained in the data collection requirements, where each phenomenon represents an occurrence of a given event at a given physical location over a given period of time. In one embodiment, the plurality of nodes in the edge layer further also include edge nodes in additional communication networks, and the data generating networked devices include at least one of tablet computers, desktop computers, laptop computers, personal digital assistants, radio frequency identification systems, radar systems, nodes in a mobile adhoc network, surveillance cameras, radio transceivers, telematics devices, package tracking systems and databases in communication with the edge nodes in the additional communication networks.

DETAILED DESCRIPTION

Figure 1:
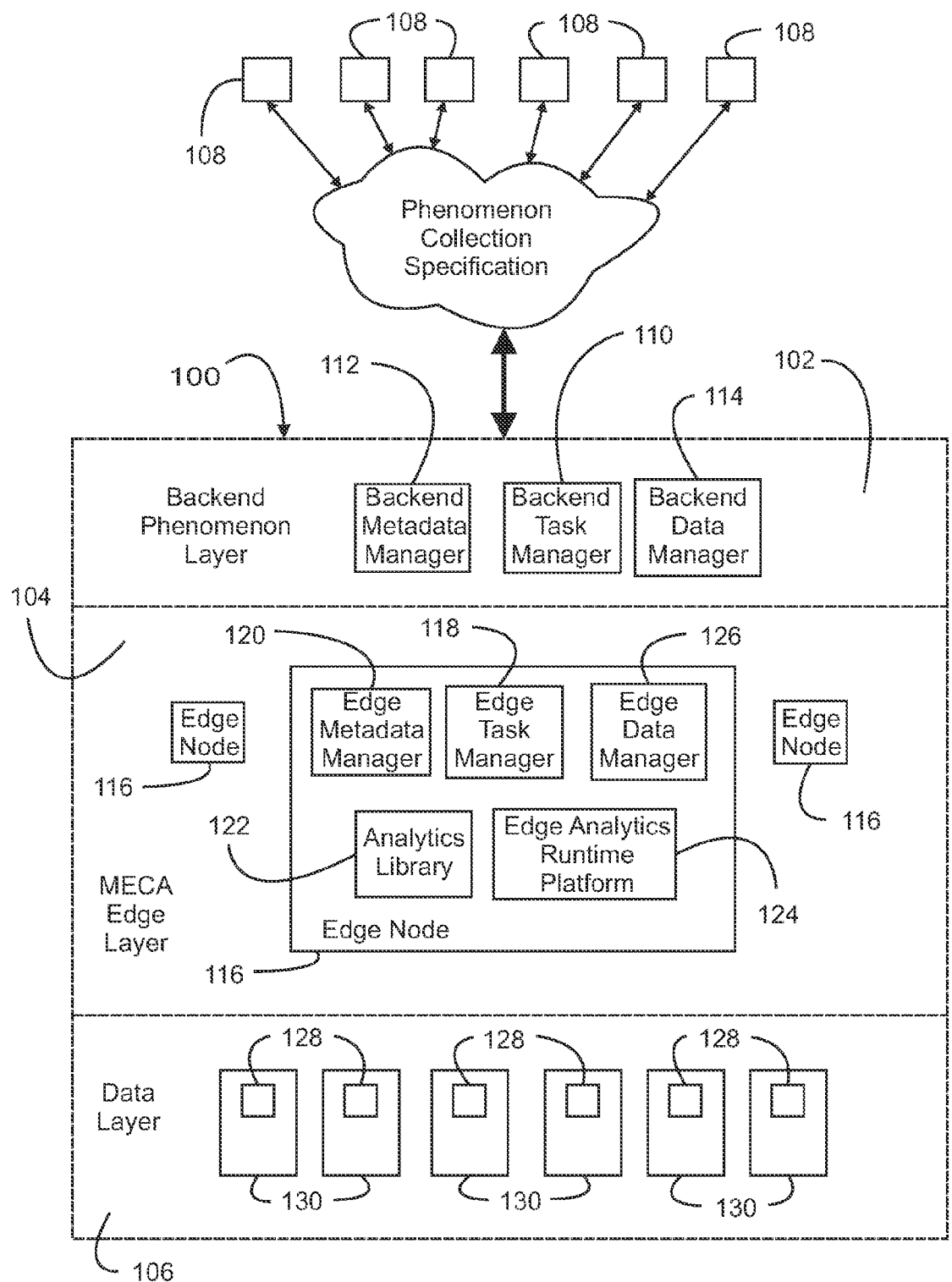
FIG. 1 is a schematic representation of an embodiment of a data capture system in accordance with the present invention.

Systems and methods in accordance with the present invention utilize mobile edge capture and analytics (MECA), which is a common middleware for data collection from data collection devices such as mobile devices that overcomes the shortcomings or previous attempts to provide data to requesting applications. MECA supports a diverse variety of data and information needs from many different applications running on computing systems, providing a high level abstraction of phenomenon, such that applications can easily express data and information needs declaratively. MECA identifies common data and information needs across different applications. This cross application identification ensures that the raw data collection and primitive processing of raw data is executed once, and the results are shared among these applications. Sharing of common raw data and phenomena across applications avoids the redundancy and conflicts found in the vertical approaches.

MECA uses a configurable framework to select and configure data collection devices based on the requirements from one or more applications. An instance of a common software agent capable of collecting different types of data runs on each one of the data collection devices. Each common software agent receives instructions from MECA and obtains and sends back the desired raw data. MECA conducts optional primitive processing on the raw data at an edge layer to extract higher level information, for example, in the form of phenomena. The raw data subjected to primitive processing is converted into phenomenon data, which is communicated back to the requesting applications through a phenomenon layer.

MECA provides a common infrastructure to collect real time data for different applications simultaneously. The middleware exposes a high level abstraction to applications, enabling these applications to express data collection specifications declaratively using phenomenon collection specifications. Each phenomenon is the occurrence of a certain kind of event at a particular physical or geographical location over a given period of time. For example, the detection of a pothole on a road at a certain location and time is a phenomenon. The use of phenomena provides information at semantic levels higher than the raw data as captured directly by the physical sensors located on a plurality of data generating networked devices. This high level abstraction is motivated by the fact that the raw data generated by physical sensors on devices usually are high volume and not directly consumable by applications and that different applications, especially those in the same domain, may have common information needs.

For example, a public facility maintenance application needs to detect potholes on a road so that proper repairs can be done on time. Potholes can be detected from the 3-axis acceleration data from smartphones carried by drivers. However, certain processing on the raw time series data has to be performed to identify the location of potential potholes. Such processing is performed within the data capture system of the present invention to improve the semantic level of information and to reduce the volume of data communicated to the applications. In addition, different applications, especially those in a common domain, may have common information needs. For example, the raw global positioning system (GPS) samples from passengers and drivers in a given vehicle are aggregated to identify their commuting trajectories. These aggregated data are useful for both real time traffic alerts and long term urban road network planning. To avoid duplicate efforts in these applications and improve efficiency, the raw data collection and primitive processing is shared inside MECA.

A data collection specification from applications running on computing systems, including phenomenon collection specifications include three parts, an identification of the type of the data or phenomenon needed, the geographic scope or physical location associated with the data or over which that data are collected and the time duration over which data should be collected. Each type of phenomenon has a clear definition of the data structure and semantics. For each type, there is at least one edge analytic that can transform certain kinds of raw data into the phenomenon. These analytics are dynamically invoked by MECA on an as-needed basis. The collection of available analytics, and thus phenomenon types, are extensible. Once a new edge analytic is added to the analytics library, the phenomenon type it produces is made available to the requesting applications.

Referring to FIG. 1, in accordance with one exemplary embodiment, the present invention is directed to a data capture system 100 that includes a phenomenon layer 102, an edge layer 104 in communication with the phenomenon layer and a data layer 106 in communication with the edge layer. The layers are located on one more suitable computing platforms, for example, computers or servers. The layers can be located one a single computing platform or on two or more distinct and separate computing platforms. In one embodiment, the layers are arranged as a distributed application. In general, these layers are logical and their physical representation may take different forms. For example, the 'edge layer' could be co-located in a cellular base station, but it can also be residing in the backend data center. The layers can be in a single domain or multiple domains. In one embodiment the layers for a daa capture system that is configured as a distributed computing system. The layers can be created using one or more software programs or software modules that are running on one or more suitable computing platforms. The data capture system is configured to receive data request specifications from one or more applications 108 executing on one or more computing systems. These computing systems can be external to the data capture system or can be the same computing systems on which the layers of the data capture system are executing.

The phenomena layer resides at the backend, e.g., a data center, and is responsible for receiving phenomenon collection specifications from applications, for coordinating the overall data collection according to the stated policies, and for sending back both raw data and the phenomenon data to the requesting applications. In one embodiment, the phenomenon layer is configured to receive the data request specifications from the applications and to generate data collection requirements responsive to the data request specifications. Each data request specification includes an identification of types of data, a time duration for collection of the types of data and physical locations associated with the types of data as requested and desired by a given application. Suitable physical locations include, but are not limited to, geographical locations, polygons in coordinates, postal address and road segments. In one embodiment, the data request specifications are phenomenon collection specifications. Each phenomenon collection specification includes an identification of at least one phenomenon desired by an application executing on a computing system and each phenomenon is an occurrence of a given event at a given physical location over a given period of time. Therefore, the applications can request data using a higher level language facilitated by phenomena and is not required to identify actual raw data. The data collection requirements generated at the phenomenon layer in response to the data request specifications include raw data and phenomena, where each phenomenon represents an occurrence of a given event at a given physical location over a given period of time and generated from raw data.

In one embodiment, the phenomenon layer includes a Collection Task Manager (CTM) 110, a Backend Metadata Manager (BMM) 112 and a Backend Data Manager (BDM) 114. The collection task manager is configured to provide an interface for applications running on computing systems to submit data request specifications and to forward the generated data collection requirements to the edge layer. The backend metadata manager is configured to maintain metadata regarding phenomena capable of being generated at the edge layer by each edge node and a physical location coverage associated with each of those nodes. The backend data manager is configured to receive raw data obtained from the data generating networked devices and phenomena generated in the edge layer using the raw data, to aggregate the received raw data and phenomena and to communicate the raw data and phenomena to the applications that submit data request specifications. In one embodiment, the collection task manager is also configured to maintain state information for data collection tasks initiated at the edge layer to satisfy the data collection requirements.

In operation, the CTM exposes an interface to applications to receive their phenomenon collection specifications. Upon receiving a specification, The CTM queries the BMM, which maintains metadata about edge nodes, including which phenomenon types are available, and the respective geographic scope. The CTM then selects appropriate edge nodes within the edge layer, sends the specification to these selected edge nodes so that the edge nodes can start data collection. The CTM creates and maintains the state information for each collection task, for example, an identification of which edge nodes are involved in data collection. When a data collection task finishes either due to the end of the time window for data collection as specified by the application request or termination by the application, the states are cleared. The BDM is responsible for receiving and aggregating data, including raw data and phenomena, from edge nodes, such that data intended for one collection task are continuously provided to the requested application.

In one embodiment, the edge layer resides on the network edges, e.g., base stations in cellular networks. In general, the edge layer is a logical concept, and the physical manifestation of the edge layer in the data capture system takes different forms, e.g., at base stations or at backend or cloud data center The edge layer receives collection requirements from the phenomena layer, manages the data collection among a subset of local data collection devices and runs edge analytics for primitive data processing. In one embodiment, the edge layer is in communication with the phenomenon layer and is configured to receive the data collection requirements and to identify raw data required to satisfy the data collection requirements. In one embodiment, the edge layer includes a plurality of edge analytics. Each edge analytic processes raw data obtained from common software agents to generate at least a portion of the phenomena contained in the data collection requirements where each phenomenon is an occurrence of a given event at a given physical location over a given period of time and generated from raw data.

In one embodiment, the edge layer includes a plurality of separate and distinct edge nodes 116. Each edge node individually or the edge layer in general includes an edge task manager 118 configured to maintain state information for data collection tasks initiated to satisfy the data collection requirements and an edge metadata manager 120 configured to maintain registration and status information for each on the of the plurality of data generating networked devices. The registration and status information includes a present location of each data generating networked device and a present energy level for each data generating networked device. The edge layer further also includes an edge analytics library 122 containing a plurality of edge analytics. Each edge analytic processes raw data obtained from common software agents to generate phenomena contained in the data collection requirements where each phenomenon is an occurrence of a given event at a given physical location over a given period of time and generated from raw data.

In one embodiment, the edge layer also includes an edge analytics runtime engine 124 configured to run edge analytics. An edge data manager 126 is provide din the edge layer and is configured to aggregate the identified raw data obtained from common software agents and to communicate the aggregated identified raw data to the backend data manager in the phenomenon layer. In general, the edge layer is responsible for the data collection from an identified set of data collection devices and for running edge analytics for primitive processing required by the specified phenomena. The various functional portions of the edge layer can be located in a single location and shared by all edge nodes within the edge layer or can be located on each edge node.

In operation, the edge task manager (ETM) maintains the state information about collection tasks at the network edge, e.g., which sensing activities on which devices are involved for which task, and coordinates the device activities and edge processing. The edge metadata manager (EMM) maintains registration and status information about data collection devices, such as their locations and energy levels, and the edge analytics library maintains a collection of edge analytics for the ETM to invoke. The edge analytics runtime platform is a container in which to deploy edge analytics, and the edge data manager (EDM) aggregates data from different devices intended for the same collection task and sends that data to the backend data manager in the phenomenon layer for further aggregation. Upon receiving the data collection requirements from the phenomena layer, the ETM first queries the EMM to identify which edge analytics can produce the required phenomena, and which data collection devices can produce the raw data needed. Then based on the locations, energy levels, and the cost of data collection and processing, a set of data collection devices is chosen, and data collection instructions are sent to those data collection devices. If an edge analytic is required for primitive processing, the ETM invokes the analytic from the library and runs it on the edge analytics runtime platform.

The data layer includes a plurality of identical common software agents 128. Each common software agent is executing on one of a plurality of data generating networked devices 130 and is in communication with the edge layer. The common software agents are configured to obtain the identified raw data required to satisfy the data collection requirements. In one embodiment, the commons agents are identical across different data generating networked devices. However, the common agents do not need to be identical on different types of data generating networked devices. In general, the common agents speak the same protocol understood by their network edge node to which they are connected. Suitable data generating networked devices include cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases or combinations thereof, and each one of the plurality of data generating networked devices is registered on one of the edge nodes.

In one embodiment, the edge layer includes a plurality of edge nodes in a network, and each edge node is in communication with at least one of a plurality of the software agents running on the plurality of data generating networked devices. In one preferred embodiment, the edge nodes are base stations in a cellular telephone network, and the data generating networked devices are cellular network communication enabled devices.

In one embodiment, the data layer is the instances of the common software agent running on all of the data generating networked devices. The data layer receives configuration and collection instructions from the edge layer and sends back data generated by physical sensors on the data generating networked devices. Each data generating networked device registers with an edge node, e.g., physically closest edge node, to make itself available for data collection. In addition, each data generating networked device reports the types of raw data it is capable of producing and periodically updates the edge node about its location and energy level such that the edge node can make a proper selection and configuration determination when a data collection requirement is received. The raw data from data generating networked devices are sent to the EDM for aggregation. If an edge analytic was invoked, this analytic takes the raw data or aggregated data and transforms them into the desired phenomenon. Such phenomena are passed to the BDM at the backend and eventually sent back to applications. Therefore, the MECA of the data capture system facilitates sharing of both the raw and phenomenon data across applications. When the same kind of phenomenon data is requested multiple times at one edge node, the existing collection and processing activities will be reused as much as possible. Raw data from a data generating networked device or phenomenon data from edge analytics are sent to the EDM and shared by multiple applications.

In one embodiment, the data capture system includes a phenomenon layer configured to receive data request specifications and to generate data collection requirements responsive to the data request specifications. Each data request specification includes an identification of types of data, a time duration for collection of the types of data and physical locations associated with the types of data. The system also includes an edge layer in communication with the phenomenon layer and containing a plurality of nodes where each node is a base station in a cellular network and is configured to receive the data collection requirements and to identify raw data required to satisfy the data collection requirements. A plurality of identical common software agents is included in the system. Each common software agent is executing on one of a plurality of data generating networked devices and in communication with the plurality of nodes in the edge layer. Each data generating networked device is a cellular network communication enabled device and the common software agents and is configured to obtain the identified raw data required to satisfy the data collection requirements from the cellular network communication enabled devices.

In one embodiment, each cellular network communication enabled device includes physical sensors, and the raw data are data obtained from these physical sensors. The system can also include a plurality of edge analytics disposed on the plurality of nodes in the edge layer. Each edge analytic is configured to process raw data obtained from the common software agents to generate phenomena contained in the data collection requirements, where each phenomenon represent an occurrence of a given event at a given physical location over a given period of time. In one embodiment, the plurality of nodes in the edge layer also include edge nodes in additional, i.e., non-cellular, communication networks, and the data generating networked devices further comprise at least one of tablet computers, desktop computers, laptop computers, personal digital assistants, radio frequency identification systems, radar systems, nodes in a mobile adhoc network, surveillance cameras, radio transceivers, telematics devices, package tracking systems and databases in communication with the edge nodes in the additional communication networks.

Figure 2:
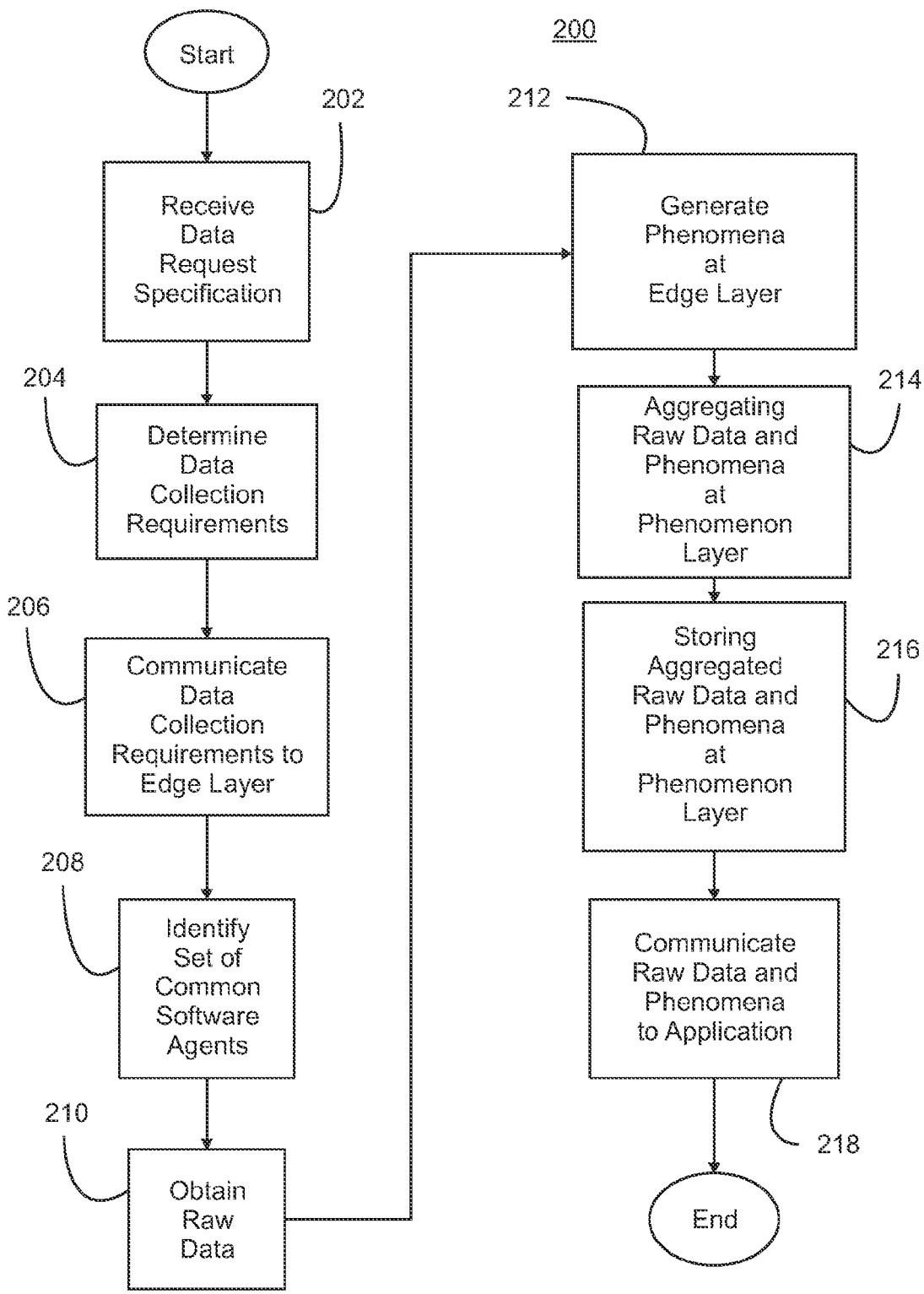
FIG. 2 is flow chart illustrating an embodiment of a method for using the data capture system of the present invention to obtain raw data and phenomena from data generating networked devices.

Referring to FIG. 2, one exemplary embodiment of the present invention is directed to a method for data collection from networked devices 200. A data request specification is received 202 at the phenomenon layer of the data capture system from an application running on a computing system. This data request specification includes an identification of the types of data desired by that application, a time duration for collection of the types of data and physical locations associated with the types of data. Preferably, the data collection specification is received as a phenomenon collection specification that includes an identification of at least one phenomenon desired by the application.

Data collection requirements are determined at the phenomenon layer 204. These data collection requirements are responsive to the data request specification and include raw data and phenomena responsive to the data request specification. Each phenomenon, as described above, describes an occurrence of a given event at a given physical location over a given time duration. The data collection requirements are then communicated to the edge layer 206 of the data capture system. In one embodiment, the edge layer contains a plurality of edge nodes, and an identification of phenomenon types supported and physical locations covered by each edge node is maintained at the phenomenon layer. Therefore, the data collection requirements are communicated from the phenomenon layer to appropriate edge nodes based on the identified phenomenon types, the covered physical locations or both. In addition, state data for the data request specification can be maintained at the phenomenon level. These state data monitor, for example, the progress of a given data request and are cleared upon termination of the data request specification. Suitable state data include, but are not limited to, a remaining time duration for data collection responsive to the data request specification and an identification of edge nodes within the edge layer involved in the data collection.

A set of common software agents within the data capture system capable of obtaining raw data sufficient to satisfy the data collection requirements are identified at the edge layer in the data capture system 208. This set of common software agents can be a subset of all available common software agents within the data capture system. Each common software agent is an identical software agent and runs on one of a plurality of data generating networked devices. Therefore, distinct or separate software agents are not required for each device, application or sensor, and the common agents can generate data that is used across and shared among all applications. In one embodiment, the edge layer includes a plurality of edge nodes in a network. Each edge node is in communication with at least one of the plurality of software agents running on the plurality of data generating networked devices. Any suitable network used to establish connectivity and communication among devices can be used including wired or wireless networks using any suitable communication protocol and local area networks and wide are networks. The data generating networked devices used to generate the raw data using sensors contained in or connected to those devices are enabled on the network and are capable of sharing data across the network. Suitable data generating networked devices include, but are not limited to, cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases and combinations thereof. In one embodiment, the network is a cellular telephone communication network. In this embodiment, the edge nodes are base stations in the cellular telephone network, and the data generating networked devices are cellular network communication enabled devices, e.g., cell phones, smart phones, tablet computers.

State information can be maintained at the edge layer for each identified common software agent while that common software agent is obtaining the raw data. In addition, registration and status information is maintained for each data generating networked device. When the edge layer is formed of a plurality of edge nodes, each data generating networked device is registered with one of the edge nodes and communicates the types of raw data available from each data generating networked device to the edge node on which that data generating networked device is registered. Period updates are also communicated from each data generating networked device to the edge node on which that data generating networked device is registered. These periodic updates include location data and energy levels for the data generating networked device.

The identified common software agents are used to obtain the appropriate or responsive raw data. These raw data are then communicated back up through the layers of the data capture system towards the requesting applications. Initially, the raw data pass through the edge layer, and the phenomena in the data collection requirements are generated at the edge layer using the obtained raw data 212. In one embodiment, the edge layer includes a plurality of edge analytics. Each edge analytic is associated with a given phenomenon and capable of being invoked to satisfy the data collection requirements. A given edge analytic can generate an entire phenomenon or can be used to contribute to a portion of one or more phenomena. The edge analytics associated with the phenomena in the data collection requirements are used to generate the phenomena. A plurality of edge analytics is maintained in a library within the edge layer. New edge analytics can be added to the library. These edge analytics can be accessible across the entire edge layer or can be specific to a given edge node within the edge layer. The phenomenon layer maintains a list of the available edge analytics and their location within the edge layer.

The combined raw data and generated phenomena are then communicated to the phenomenon layer. The raw data and phenomena responsive to the data request specification are aggregated at the phenomenon layer 214. In addition, the aggregated raw data and phenomena are stored at the phenomenon layer 216. Since the data are generated by common software agents and edge analytics, they are suitable for use in responding to subsequent data request specifications across all applications. The aggregated raw data and phenomena responsive to the data request specification are communicated from the phenomena layer to the requesting application 218.

In one embodiment of the method for data collection from networked devices in accordance with the present invention, data request specifications are received at the phenomenon layer of the data capture system from a plurality of applications running on one or more computing systems. Again, each data request specification includes an identification of types of data desired by each application, a time duration for collection of those types of data and physical locations associated with the types of data. The data collection requirements responsive to all of the received data request specifications are determined at the phenomenon layer. These data collection requirements comprising raw data and phenomena responsive to the data request specifications, and the data request specifications received from the applications are preferably in the form of phenomena request specifications. The phenomenon layer, identifies and aggregates the data collections requirements across all requests. Therefore, if different phenomena requested from different applications require the same raw data or if different applications request the same phenomena, then the phenomenon layer does not duplicate raw data and phenomena in the data collection requirements. In one embodiment, two applications can request the same type of data, but at different locations or for different time periods. The phenomenon layer incorporates these requests into the data collection requirements in the most efficient manner, e.g., a single type of data with expanded time or location ranges to cover both requests.

The set of common software agents within the data capture system capable of obtaining raw data sufficient to satisfy the data collection requirements are identified at the edge layer in the data capture system, and these identified common software agents are used to obtain the raw data. The phenomena in the data collection requirements are generated at the edge layer, and the raw data and phenomena responsive to the data request specification are communicated to the phenomenon layer. The phenomenon layer is used to coordinate communication of the phenomena and raw data among the applications based, for example, on an understanding of how the phenomenon layer broke down and aggregated the data collection requests for purposes of efficiency.

In one example, the data capture system is used in a disaster management application that provides services for both individuals and authorities in a chemical spill scenario. The application uses the data and information collected by the MECA, illustrating the benefits of MECA compared to existing vertical approaches including a high level abstraction of phenomena collection specification. The application does not need to interact directly with any of the data generating networked devices, i.e., mobile devices. Unlike the vertical approach, it does not need to be concerned about the dynamic changes such as device mobility and resource variations. MECA handles all those dynamics and makes them transparent to the application. The application only needs to send phenomenon collection specification about the phenomena types, geographical scopes and time durations to MECA.

In addition, concurrent collection of phenomenon and raw data of different types is supported. The application provides an alert service to individuals when they get too close to a danger zone, and warning services for authorities such as the fire department to track the movements of fire fighters. These services require phenomenon and raw data of different types, which are collected by MECA simultaneously. Intelligent and efficient processing is provided at the network edge. MECA has edge analytics that conduct primitive processing on the raw data collected. The resulting phenomenon data has much less volume, and carries higher level semantics that are more easily consumable by the application. In addition, metadata and policy driven device selection and configuration are provided. MECA maintains the metadata of devices such as their locations, and data collection capabilities. There are also policies regarding how devices should be chosen and configured based on their resource levels. MECA selects and configures a subset of devices based on the metadata and policies.

In this example, a disaster management application is developed using data collected from mobile devices. It illustrates the benefits of MECA for social networks in both natural disaster and terrorist attack scenarios. The application sends alert messages to individuals who have subscribed to the system to receive notifications of nearby dangers. Examples include approaching a downed power line, a chemical spill, or radioactive contamination. It also enables the authorities to track the status of emergency response personnel, e.g., if a person does not move for a long period of time, or moves very slowly, it may indicate an injury or difficulty that needs attention. In a chemical spill scenario, an individual notices hazardous material and calls to report the incident. A dispatcher receives the call and collects information such as the type of emergency, location and time when first noticed and informs first responders. Police, HAZMAT, fire fighters, and a medical team are among the responders sent to the area. Police or fire fighters are usually first to arrive, and the first thing they do is to isolated the high-risk area, also known as a "hot zone" from so-called "cold-zones", e.g., the safe area. A small area separates these two zones, which is referred to as a "warm zone."

These zones can be represented on a map as concentric circles, with the "hot zone" being the inner circle and the "warm zone" being an outer circle. Outside the outer circle is the "cold zone". Everyone who enters the hot zone is contaminated and has to go through decontamination process to enter the cold zone. Other responders including the medical team cannot enter the hot zone until it is declared safe by special forces. The fire captain and other team leaders need to keep their team members safe and away from the hot zone. If a person enters the warm zone, an alert message is sent to warn that person from potential danger of chemical exposure. After special forces including HAZMAT clean the area and safely separate contaminated people, they declare the area safe. Hence other first responders including the medical team and fire fighters can enter the area.

From this point forward, it is critical for team leaders to monitor the movement mode of their team members in the response if non-movement or slow motion is detected. The context of this application determines the types of phenomenon that are needed from the MECA middleware. The two phenomena of interest in this scenario and processed from different data types are entering a zone of interest, which utilizes location data from GPS, and a movement mode phenomenon utilizing acceleration data. Decision makers or individuals each specify the phenomenon of interest at a given location and within a time window. They input the phenomenon collection specifications through a user-friendly template by identifying the phenomenon of interest in a rectangular geographical area and a certain time duration. MECA processes the specifications, and identifies edge nodes that are capable of producing these two phenomenon types and whose responsible collection areas overlap with the specified geographical scopes. A subset of suitable edge nodes is selected and the phenomena layer forwards the collection specifications to them. These edge nodes in turn identifies that there exist edge analytics that can produce the movement mode and approaching zone phenomenon, which further require the acceleration and GPS location data from devices as raw data input. Thus the edge nodes instruct these devices for relevant data collection. Finally the data are processed and the phenomena sent to the application, which generates danger zone alerts and movement mode warnings for individuals and authorities.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution.

Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for data collection from networked devices in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A data capture system comprising:
a phenomenon layer configured to receive data request specifications and to generate data collection requirements responsive to the data request specifications, each data request specification comprising an identification of types of data, a time duration for collection of the types of data and physical locations associated with the types of data;
an edge layer in communication with the phenomenon layer and configured to receive the data collection requirements and to identify raw data required to satisfy the data collection requirements; and
a plurality of identical common software agents, each common software agent executing on one of a plurality of data generating networked devices and in communication with the edge layer, the common software agents configured to obtain the identified raw data required to satisfy the data collection requirements.

2. The system of claim 1, wherein the edge layer on an edge node comprises an edge task manager configured to maintain state information for data collection tasks initiated to satisfy the data collection requirements and an edge metadata manager configured to maintain registration and status information for each on the of the plurality of data generating networked devices.

3. The system of claim 2, wherein the edge layer further comprises an edge analytics engine comprising a plurality of edge analytics, each edge analytic configured to process raw data obtained from the common software agents to generate phenomena contained in the data collection requirements, each phenomenon comprising an occurrence of a given event at a given physical location over a given period of time and generated from raw data.

4. The system of claim 3, wherein the edge layer further comprises an edge analytics runtime engine configured to run edge analytics.

5. The system of claim 2, wherein the registration and status information comprises a present location of each data generating networked device and a present energy level for each data generating networked device.

6. The system of claim 2, wherein the edge layer further comprises an edge data manager configured to aggregate the identified raw data obtained from the common software agents and to communicate at least one of the aggregated identified raw data and phenomenon data created using edge analytics to a backend data manager in the phenomenon layer.

7. The system of claim 1, wherein the phenomenon layer comprises:
a collection task manager configured to provide an interface for applications running on computing systems to submit data request specifications and to forward the generated data collection requirements to the edge layer;
a backend metadata manager configured to maintain metadata regarding phenomena capable of being generated by different edge nodes at the edge layer and a physical location coverage associated with each edge node; and
a backend data manager configured to receive raw data obtained from the data generating networked devices and phenomena generated in the edge layer using the raw data, to aggregate the received raw data and phenomena and to communicate the raw data and phenomena to the applications that submit data request specifications.

8. The system of claim 7, wherein the collection task manager is further configured to maintain state information for data collection tasks initiated at the edge layer to satisfy the data collection requirements.

9. The system of claim 1, wherein the edge layer comprises a plurality of edge nodes in a network, each edge node in communication with at least one of a plurality of software agents running on the plurality of data generating networked devices.

10. The system of claim 9, wherein the edge nodes comprise base stations in a cellular telephone network and the data generating networked devices comprise cellular network communication enabled devices.

11. The system of claim 1, wherein the phenomenon layer is configured to receive data request specifications comprising phenomenon collection specifications, each phenomenon collection specification comprising an identification of at least one phenomenon desired by an application executing on a computing system, each phenomenon comprising an occurrence of a given event at a given physical location over a given period of time.

12. The system of claim 1, wherein the data collection requirements comprise raw data and phenomena, each phenomenon comprising an occurrence of a given event at a given physical location over a given period of time and generated from raw data.

13. The system of claim 1, wherein the edge layer comprises a plurality of edge node, each edge node comprising a plurality of edge analytics, each edge analytic configured to process raw data obtained from the common software agents to generate phenomena contained in the data collection requirements, each phenomenon comprising an occurrence of a given event at a given physical location over a given period of time and generated from raw data.

14. The system of claim 1, wherein the edge layer comprises a plurality of edge nodes and each one of the plurality of data generating networked devices is registered on one of the edge nodes.

15. The system of claim 1, wherein the plurality of data generating networked devices comprises cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases or combinations thereof.

16. A data capture system comprising:
a phenomenon layer configured to receive data request specifications and to generate data collection requirements responsive to the data request specifications, each data request specification comprising an identification of types of data, a time duration for collection of the types of data and physical locations associated with the types of data;
an edge layer in communication with the phenomenon layer and comprising a plurality of nodes, each node comprising a base station in a cellular network and configured to receive the data collection requirements and to identify raw data required to satisfy the data collection requirements; and
a plurality of identical common software agents, each common software agent executing on one of a plurality of data generating networked devices and in communication with the plurality of nodes in the edge layer, each data generating networked device comprising a cellular network communication enabled device and the common software agents configured to obtain the identified raw data required to satisfy the data collection requirements from the cellular network communication enabled devices.

17. The system of claim 16, wherein each cellular network communication enabled device comprises physical sensors and the raw data comprise data obtained from these physical sensors.

18. The system of claim 16, wherein the system further comprises a plurality of edge analytics disposed on the plurality of nodes in the edge layer, each edge analytic configured to process raw data obtained from the common software agents to generate phenomena contained in the data collection requirements, each phenomenon comprising an occurrence of a given event at a given physical location over a given period of time.

19. The system of claim 16, wherein the plurality of nodes in the edge layer further comprise edge nodes in additional communication networks and the data generating networked devices further comprise at least one of tablet computers, desktop computers, laptop computers, personal digital assistants, radio frequency identification systems, radar systems, nodes in a mobile adhoc network, surveillance cameras, radio transceivers, telematics devices, package tracking systems and databases in communication with the edge nodes in the additional communication networks.

* * * * *